United States Patent [19]
Saia et al.

[11] Patent Number: 5,472,539
[45] Date of Patent: Dec. 5, 1995

[54] METHODS FOR FORMING AND POSITIONING MOLDABLE PERMANENT MAGNETS ON ELECTROMAGNETICALLY ACTUATED MICROFABRICATED COMPONENTS

[75] Inventors: Richard J. Saia, Schenectady; Kevin M. Durocher, Waterford; Thomas B. Gorczyca, Schenectady; Mario Ghezzo, Ballston Lake, all of N.Y.

[73] Assignee: General Electric Company, Schenectady, N.Y.

[21] Appl. No.: 254,725

[22] Filed: Jun. 6, 1994

[51] Int. Cl.[6] .................................................... B32B 31/28
[52] U.S. Cl. ...................... 156/155; 156/248; 156/633.1; 156/656.1; 427/259; 427/271; 427/272
[58] Field of Search .................................. 427/259, 271, 427/272; 156/155, 252, 248, 633, 668, 656

[56] References Cited

U.S. PATENT DOCUMENTS

| | | | |
|---|---|---|---|
| Re. 29,284 | 6/1977 | Shaheen et al. | 427/259 X |
| 3,142,784 | 7/1964 | Bloomfield | 317/113 |
| 3,897,288 | 7/1975 | Fayling | 156/60 |
| 3,956,052 | 5/1976 | Koste et al. | 156/247 |
| 4,346,125 | 8/1982 | Kinsbron et al. | 427/259 X |
| 4,674,180 | 6/1987 | Zavracky et al. | 29/622 |
| 4,842,677 | 6/1989 | Wojnarowski et al. | 156/643 |
| 5,019,946 | 5/1991 | Eichelberger et al. | |
| 5,108,825 | 4/1992 | Wojnarowski et al. | |
| 5,161,093 | 11/1992 | Gorczyca et al. | |
| 5,213,703 | 5/1993 | Furuyama et al. | 252/62.54 |
| 5,262,000 | 11/1993 | Welbourn et al. | 156/643 |

OTHER PUBLICATIONS

F. Cadieu, "Permanent Magnet Thin Films: A Review of Film Synthesis and Properties", Physics of Thin Films, M. Francombe and J. Vossen, Editors, vol. 16, Academic Press Inc., 1992.

B. Wagner and W. Benecke, "Microfabricated Actuator with Moving Permanent Magnet", IEEE MEMS '91, Nara, Japan (1991).

Primary Examiner—David A. Simmons
Assistant Examiner—Steven J. Helmer
Attorney, Agent, or Firm—Marvin Snyder

[57] ABSTRACT

A low temperature batch method for forming and positioning permanent magnets on electromagnetically actuated micro-fabricated components, such as electrical switches employs a first adhesive, such as a Siltem/epoxy blend of an epoxy resin and a siloxane polyimide polymer, to releasably attach a mold layer of Kapton polyimide to a substrate, which may be the movable portion of a micromechanical structure, or a precursor to such movable portion. A well-shape cavity is formed in the mold layer, and filled with a slurry of rare earth NdFeB magnetic particles suspended in a second adhesive, which is cured to form the body of a magnet. The second adhesive is an SPI/epoxy blend, also of an epoxy resin and a siloxane polyimide polymer, but with a greater adhesion strength and a higher temperature softening point compared to the Siltem/epoxy blend. The entire structure is heated, and the mold layer is pulled off the substrate, while the body of magnetic material remains firmly attached. Selective etchants may be subsequently employed to remove metal sacrificial layers, while the NdFeB magnetic particles are protected from attack by the etchant by being effectively encased in plastic.

10 Claims, 5 Drawing Sheets fig. 1 fig. 2 fig. 3 fig. 4 fig. 5 fig. 6 fig. 7 fig. 8 fig. 9 fig. 10

METHODS FOR FORMING AND POSITIONING MOLDABLE PERMANENT MAGNETS ON ELECTROMAGNETICALLY ACTUATED MICROFABRICATED COMPONENTS

BACKGROUND OF THE INVENTION

The present invention relates generally to microfabrication methods. More particularly, the invention relates to methods for forming and positioning moldable permanent magnets on electromagnetically actuated microfabricated components, such as electrical switches. Micromachining is a recent technology for fabricating micromechanical moving structures. In general, semiconductor batch fabrication techniques are employed to achieve what is in effect three-dimensional machining of single-crystal and polycrystalline silicon and silicon dielectrics, producing such structures as micromotors, microsensors and switches. Thus, except for selective deposition and removal of materials on a substrate, conventional assembly operations are not involved.

Electromagnetically actuated micromechanical components include permanent magnets attached to a microfabricated moving structure. A separate electromagnet, appropriately energized, produces a controllable magnetic field which cooperates with the permanent magnet to cause the microfabricated element to move.

One example of an electromagnetically actuated microfabricated component is disclosed in an article by B. Wagner and W. Benecke, "Microfabricated Actuator with Moving Permanent Magnet" IEEE MEMS '91, Nara, Japan (1991). Another example is disclosed in commonly-assigned Ghezzo et al. U.S. patent application Ser. No. 08/000,172, filed Jan. 4, 1993, entitled "Micromechanical Moving Structures Including Multiple Contact Switching System, and Micromachining Methods Therefor."

A temporary structure, known alternatively as a release layer or as a sacrificial layer, is critical for micromachining because it allows moving parts to be formed by self-registered casting methods, with subsequent selective etching to remove the sacrificial layer. Since micromachining originated from the technology of silicon integrated circuit processing, low-temperature $SiO_2$ is commonly employed as a sacrificial layer material. However, metals may also be employed for the sacrificial layer. For example, the use of a copper sacrificial layer is disclosed in the above-identified application Ser. No. 08/000,172.

The fabrication of such structures also requires that magnets somehow be attached to or formed on a movable element. In general, two approaches have previously been employed.

The first approach has been to attach magnets using pick-and-place equipment. This approach, however, has several disadvantages. In particular, the overall process is relatively time-consuming, in that suitable magnets must be purchased, and the magnets must be cut to a specific size, which is difficult with tiny elements. The magnets are then carefully placed and secured in position employing a suitable adhesive. Thus, while rare earth NdFeB magnets are effectively used in miniature components as small as 1 mm, they are difficult to machine, and in general are costly to produce.

The second approach has been to deposit magnetic material employing RF sputtering techniques. It has been observed, however, that crack-free rare earth transition metal films cannot be deposited with thicknesses greater than about 10 μm. Such is reported for example in F. Cadieu, "Permanent Magnet Thin Films: A Review of Film Synthesis and Properties" Physics of Thin Films, M. Francombe and J. Vossen, Editors, Volume 16, Academic Press Inc., 1992. In addition, to obtain the desired physical properties, the films need to be heated to temperatures greater than 400° C. While such may be possible in the case of silicon micromachining in general, such temperatures cannot be used in the presence of materials employed in high density interconnect (HDI) technology.

More particularly, what is known as high density interconnect (HDI) technology for multi-chip module packaging, is disclosed for example in Eichelberger et al. U.S. Pat. No. 4,783,695. Very briefly, in systems employing this high density interconnect structure, various components, such as semiconductor integrated circuit chips, are placed within cavities formed in a ceramic substrate. A multi-layer overcoat structure is then built up to electrically interconnect the components into an actual functioning system. To begin the multi-layer overcoat structure, a polyimide dielectric film, such as Kapton polyimide (available from E. I. DuPont de Nemours & Company, Wilmington, Del.), about 0.5 to 3 mils (12.7 to 76 microns) thick, is laminated across the top of the chips, other components and the substrate, employing Ultem® polyetherimide resin (available from General Electric Company, Pittsfield, Mass.) or another thermoplastic as an adhesive. The actual as-placed locations of the various components and contact pads thereon are determined by optical sighting, and via holes that are adaptively laser drilled in the Kapton film and adhesive layers in alignment with the contact pads on the electronic components. Exemplary laser drilling techniques are disclosed in Eichelberger et al. Pat. Nos. 4,714,516 and 4,894,115; and in Loughran et al. Pat. No. 4,764,485, each of which is incorporated by reference. Such HDI vias are typically on the order of one to two mils (25 to 50 microns) in diameter. A metallization layer is deposited over the Kapton film layer and extends into the via holes to make electrical contact to chip contact pads. This metallization layer may be patterned to form individual conductors during the deposition process, or it may be deposited as a continuous layer and then patterned using photoresist and etching. The photoresist is preferably exposed using a laser which is scanned relative to the substrate to provide an accurately aligned conductor pattern upon completion of the process. Exemplary techniques for patterning the metallization layer are disclosed in Wojnarowski et al. U.S. Pat. Nos. 4,780,177 and 4,842,677; and in Eichelberger et al. Pat. No. 4,835,704 which discloses an "Adaptive Lithography System to Provide High Density Interconnect" each of which is incorporated by reference. Any misposition of the individual electronic components and their contact pads is compensated for by an adaptive laser lithography system as disclosed in U.S. Pat. No. 4,835,704. Additional dielectric and metallization layers are provided as required in order to make all of the desired electrical connections among the chips.

As is described in detail hereinbelow, one aspect of the present invention is the fabrication of molded permanent magnets on micromechanical structures employing a modified HDI technology, including use of a polymer such as a polyimide (e.g. Kapton) as a mold material.

SUMMARY OF THE INVENTION

It is an object of the invention to provide a low cost, low temperature, batch method of forming and positioning permanent magnets on electromagnetically actuated microfabricated components.

It is another object of the invention to provide a method for forming precision placed permanent magnets of any size and shape using batch processing.

It is another object of the invention to provide permanent magnets for electromagnetically actuated microfabricated components which require a minimum of magnetic field strength to activate when attached to a microfabricated actuator and which are impervious to etchants used for removing sacrificial layers in micromachining processes.

It is yet another object of the invention to provide methods for forming such permanent magnets which are compatible with HDI processing, and which can employ the same equipment as in HDI processing.

Briefly, and in accordance with one aspect of the invention, a method is provided for forming a body of magnetic material on a substrate, which substrate may be the movable portion of a micromechanical structure, or a precursor to such movable portion. As an initial step, a first adhesive is employed to releasably attach a mold layer of polymer material to the substrate, such as a mold layer of Kapton polyimide. The first adhesive may comprise a blend of an epoxy resin and a siloxane polyimide polymer.

Next, a well-shaped cavity is formed in the mold layer of polymer material. The well-shaped cavity extends through the mold layer to the substrate, and the thickness of the mold layer defines the thickness of the magnet ultimately formed. The well-shaped cavity is preferably formed by laser ablation. Typically, a metal mask is provided over the mold layer, with an opening in the metal mask defining the cavity location. The polymer layer is then ablated with the laser where not masked.

The well-shaped cavity is then filled with a slurry of magnetic particles suspended in a second adhesive, and the second adhesive is cured to form the body. The second adhesive likewise preferably comprises a blend of an epoxy resin and siloxane polyimide polymer, but with a different polyimide which results in a greater adhesion strength and a higher-temperature softening point compared to the first adhesive.

Finally, the mold layer of polymer material and the first adhesive are removed under conditions which allow the body to remain adhered to the substrate. Typically, the entire structure is heated, allowing the mold layer to be peeled off the substrate while the body of magnetic material remains firmly attached, and any residue of the first adhesive is then removed with a suitable solvent.

In accordance with another aspect of the invention, a method is provided for fabricating an electromagnetically actuated micromechanical structure. An initial step is fabricating a precursor to the micromechanical structure, the precursor including a base, an element subsequently to become movable relative to the base, and a sacrificial layer separating the base and the element and supporting the base on the element. For example, the element may comprise an electrical switch contact, and the precursor to a micromechanical structure may include an electromagnet within its structure.

A body of magnetic material is then formed on the element subsequently to become movable relative to the base in the manner summarized just above, with the element serving as the "substrate" of the method initially summarized hereinabove.

After the mold layer of polymer material and the first adhesive are removed under conditions which allow the thus-formed magnetic body to remain adhered to the element, the element is released for movement relative to the base by employing a selective etch to remove the sacrificial layer. Significantly, even when the sacrificial layer is a metal, such as copper, the magnetic particles comprising the magnetic body are protected from the etchant by being, in effect, encased in plastic.

At an appropriate point in the process, the magnet is magnetized employing an electromagnet.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description, taken in conjunction with the drawings, in which:

DETAILED DESCRIPTION

Figure 1:
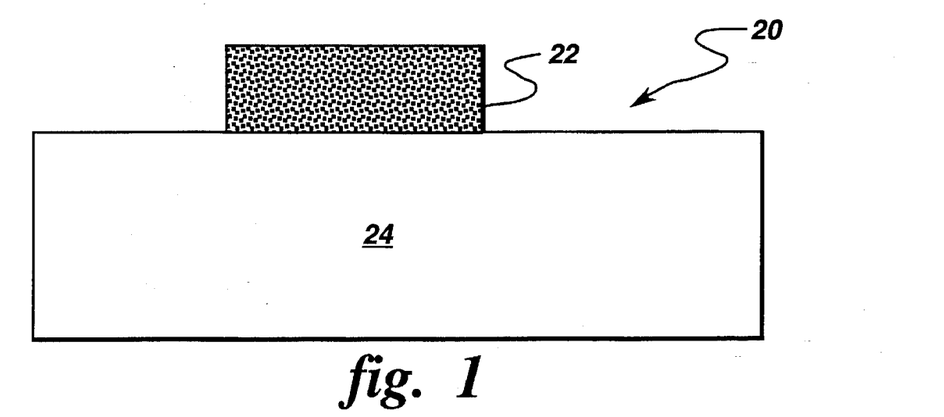
FIG. 1 is a cross-sectional representation of a body of magnetic material formed on a substrate in accordance with the invention.

FIG. 1 illustrates a structure 20 including a micromolded permanent magnet 22 adhered to a generalized substrate 24. It will be appreciated that substrate 24 is representative of a variety of substrates which may comprise movable elements of micromechanical structures. Magnet 22 preferably is a rare earth NdFeB magnet comprising powdered NdFeB metal suspended in a thermosetting plastic, and magnetized employing, for example, a magnetic field strength in the order of 20 kOe, produced by a suitable electromagnet.

Magnet 22 is relatively small, typically 80 mils square, and 10 mils thick. In a typical microfabricated component, such as an electromagnetically actuated switch, a multiplicity of individual structures are formed at one time, such as one thousand, as is conventional in semiconductor batch fabrication processes. Thus the single magnet 22 is representative of many magnets.

Substrate 24 can be any structure which requires an attached permanent magnet, such as a silicon device or HDI type micromechanical device. Significantly, all of the processing steps for magnet attachment described hereinbelow are compatible with the materials employed in HDI fabrication, including the multilaminated dielectric layers and adhesives of HDI structures.

Figure 2:
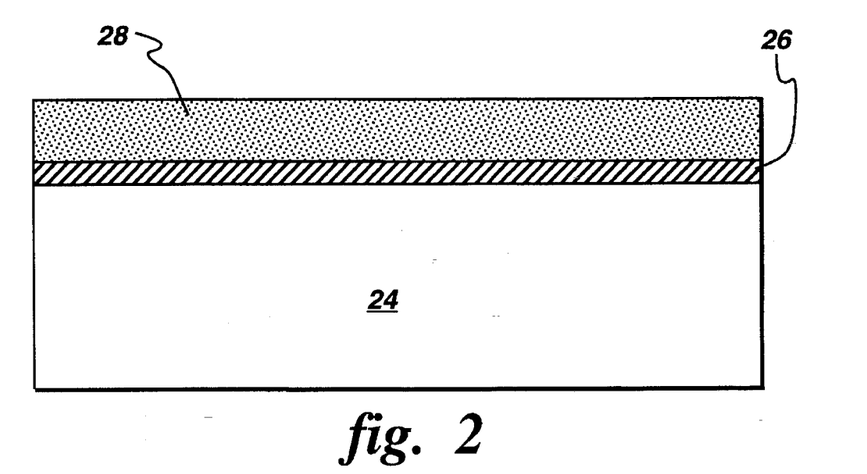
FIG. 2 is a cross-sectional view depicting an initial step in the fabrication of the FIG. 1 structure.

With reference now to FIG. 2, in a process for forming the structure 20 of FIG. 1, a first adhesive 26 is employed to releasably attach a mold layer 28 of polymer material, such as Kapton polyimide, to substrate 24. More particularly, first adhesive 26 comprises a blend of an epoxy resin and a siloxane polyimide polymer, which is spin coated onto substrate 24, to a thickness of approximately 12 μm.

Preferably, the siloxane polyimide polymer is one available under the trademark Siltem from General Electric Company. Siltem polymers are siloxane-containing polyimides, where the siloxane units can be between the anhydride groups or amine groups, and/or randomly placed or blocked together more closely along the polymer chain, depending upon the particular polymer, and account for between 20% and 40% of the polymer composition by weight.

A suitable epoxy resin is a cycloaliphatic epoxy such as Ciba Geigy CY179 epoxy.

By way of example, the following is one formulation for a Siltem/epoxy copolymer blend suitable for the first adhesive 26 using an octacat catalyst which is an octyloxyphenyl (phenyl) iodinium hexafluoroantimonate catalyst:

| Material | grams | notes |
|---|---|---|
| Siltem 1500 | 100 | Siltem is obtained as a dry, extruded polymer |
| anisole | 150 | solvent |
| cyclopentanone | 50 | solvent |
| CY179 | 100 | epoxy resin |
| octacat | 1 | catalyst |

The epoxy content can vary from about 25% to 75% of the total solids content of the blend. Cocatalysts are not necessary in the blend to cure the epoxy resin, but can be added if a shorter cure time is necessary.

To enhance releasability, Benzoflex-S522, which is a plasticizer commercially available from Velsicol Company, can be added to the Siltem blend to further lower its softening point.

Kapton polyimide layer 28, which has the thickness of the ultimate magnetic body 22, is laminated to substrate 24, using the Siltem/epoxy blend as the adhesive 26. For example, a Kapton film layer 28 ten mils thick may be employed. It will be appreciated that mold layer 28 of polymer material may comprise either a single layer, such as a Kapton film of 10 mil thickness, or may comprise a multilayer lamination with several sublayers, for example two layers of 5 mil Kapton, with an SPI/epoxy adhesive blend (described hereinbelow in greater detail) between the two Kapton layers. To provide additional mechanical support, the structure could be laminated into a suitable HDI-backed carrier.

Figure 3:
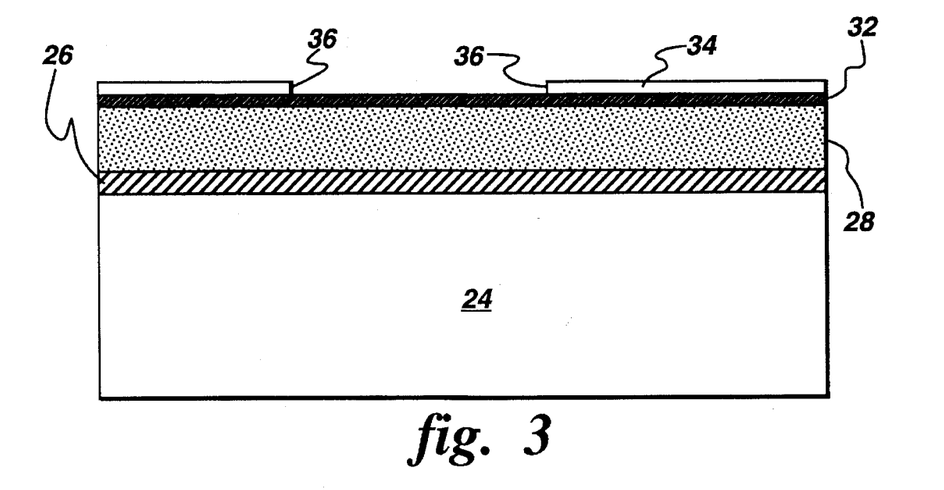
FIG. 3 depicts a processing step subsequent to that of FIG. 2.
Figure 4:
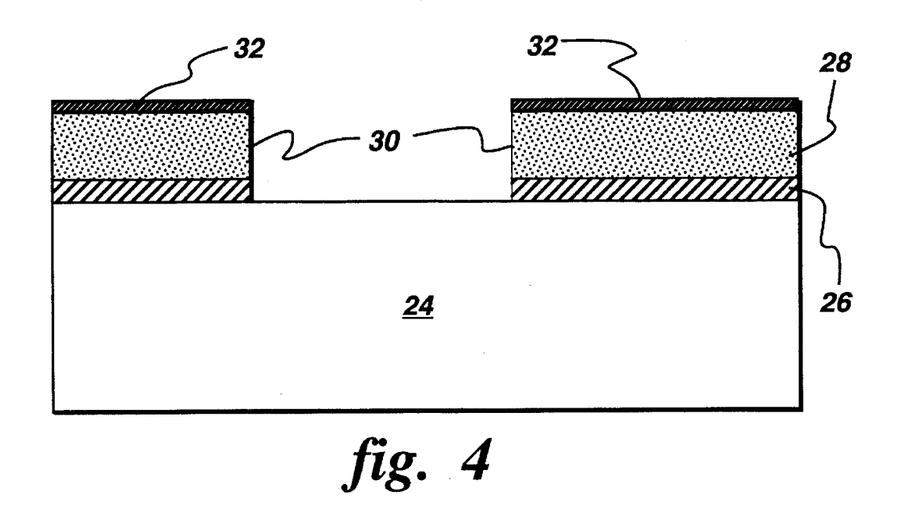
FIG. 4 depicts a well-shaped cavity in the structure resulting from a processing step after that represented by FIG. 3.

Next, as represented in FIGS. 3 and 4, a well-shaped cavity 30 is formed in mold layer 28, extending through mold layer 28 to substrate 24. More particularly, as represented in FIG. 3, a 2,000Å copper layer 32 is sputtered onto the top surface of Kapton mold layer 28, with a pre-backsputter employed to promote adhesion. Additional copper is electroplated for a total thickness of layer 32 of 4 μm. A suitable photoresist layer 34 is deposited over copper layer 32 by either spinning or spraying techniques, patterned with a computer-controlled laser, such as an argon-ion laser, and developed to form mask openings 36 which define the ultimate magnet size, shape and alignment with reference to the underlying substrate 24. Copper mask layer 32 is etched in an FeCl₃ solution using photoresist layer 34 as a mask.

Kapton mold layer 28 is then ablated employing an XeCl excimer laser (not shown). The laser beam is relatively wide, and is directed in a raster scan pattern over the entire working area, in contrast to laser dithering as described, for example, in the above-identified Pat. No. 4,894,115. The structure of FIG. 4 results.

At this juncture, copper mask layer 32 is removed, and the entire structure is coated with a thin 80Å layer of TiW. The TiW layer at the bottom of cavity 30 serves as an adhesion layer for the magnet subsequently to be formed.

Figure 5:
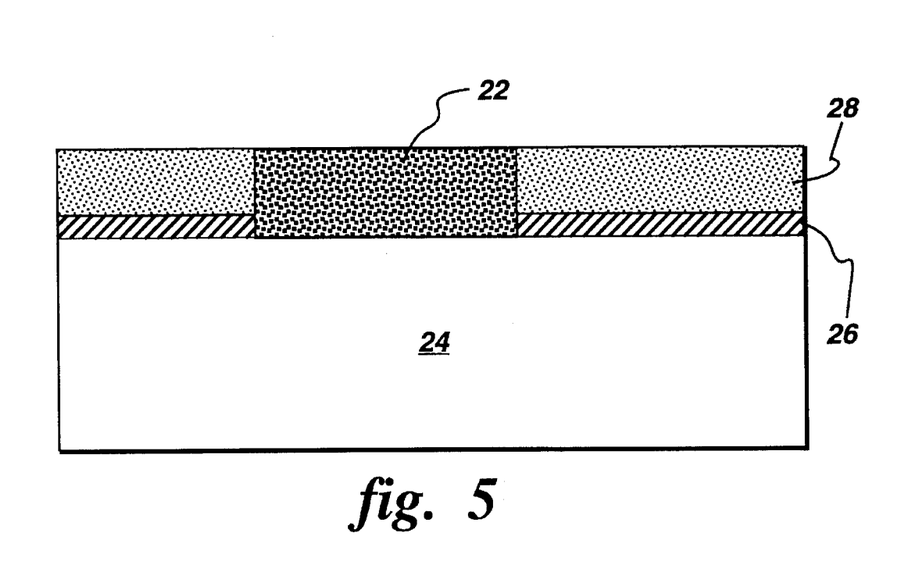
FIG. 5 depicts, in cross section, the magnet of the FIG. 1 structure being molded.

Well-shaped cavity 30 is filled with a slurry of magnetic particles in a second adhesive, and then cured to form the body 22. As a particular example, a slurry of NdFeB rare earth magnet material in SPI/epoxy blend is prepared. The slurry contains 70% NdFeB by weight in SPI/epoxy solution. The NdFeB is ground down to particles 2 mils in size. The slurry is mixed well, applied onto the surface of the part, and drawn employing a glass rod. The slurry containing NdFeB settles in the micromold form.

The structure is then partially cured by baking for one hour at 100° C. This partial curing results in material shrinkage due to solvent evaporation. Additional slurry may be reapplied in a second identical application to refill mold cavity 30, and the structure is then rebaked for one hour at 100° C. The temperature is ramped to 200° C. for an additional hour. In order to provide a top coat which will remain on top of magnet 22, the structure is optionally coated with an additional layer of SPI/epoxy.

More particularly, the second adhesive, like the first, comprises a blend of an epoxy resin and a siloxane polyimide polymer, but with a formulation which provides relatively greater adhesion strength when heated, and a higher glass transition temperature. Representative blends of an epoxy resin and a siloxane polyimide polymer are disclosed in Wojnarowski et al Pat. No. 5,108,825, entitled "Epoxy/Polyimide Copolymer Blend Dielectric and Layered Circuits Incorporating It", and in Gorczyca et al. Pat. No. 5,161,093, entitled "Multiple Lamination High Density Interconnect Process and Structure Employing a Variable Crosslinkng Adhesive." By way of more particular example, siloxane polyimide blends such as SPI-129 and SPI-135, available from Huls America of Phoenix, Ariz. are solutions of, for example, 29% or 35% polymer solid in solvent, and have as their polymer a siloxane containing polyimide.

SPI is a random polymer composed of BPADA (or bisphenol A dianhydride), toluene diamine and GAPD9 (or alpha, omega bis gamma aminopropyl polydimethylsiloxane D9 diamine). Siltem polymer differs from SPI in that Siltem is made up of BPADA meta phenylene diamine and GAPD9 diamine polymerized in a two-step sequence to "block" the siloxane diamines together along the polymer chain. Also, the GAPD9 concentration in Siltem is higher than in SPI, resulting in higher siloxane content and corresponding low glass transition temperature, Tg. Higher siloxane containing polymers also seem to have inherently poorer adhesion to Kapton film.

A typical and suitable formulation for an SPI/epoxy is:

| Material | grams | notes |
|---|---|---|
| SPI-135 | 571 | 200 gr polymer, the rest is diglyme and xylene solvents |
| CY179 | 200 | epoxy resin |
| octacat | 2 | catalyst |

Next, mold layer 28 and first adhesive 26 are removed while allowing body 22 to remain adhered to substrate 24, to produce the structure of FIG. 1. Thus the laminated micromold attached by Siltem/epoxy blend adhesive 26 is selectively depelted. The selective depelting is made possible by the fact that adhesion of the Siltem/epoxy blend to Kapton polyimide is reduced to less than two pounds per square inch when heated to about 120° C. The SPI/epoxy blend adhesive which is used in the HDI multilamination process, for example, has a much higher adhesion at that temperature. After depelting, any residual Siltem/epoxy is removed using a solvent such as cyclopentanone. At a suitable point in the process, magnet 22 is magnetized in a magnetic field on the order of 20 kOe, employing an electromagnet (not shown).

Figure 6:
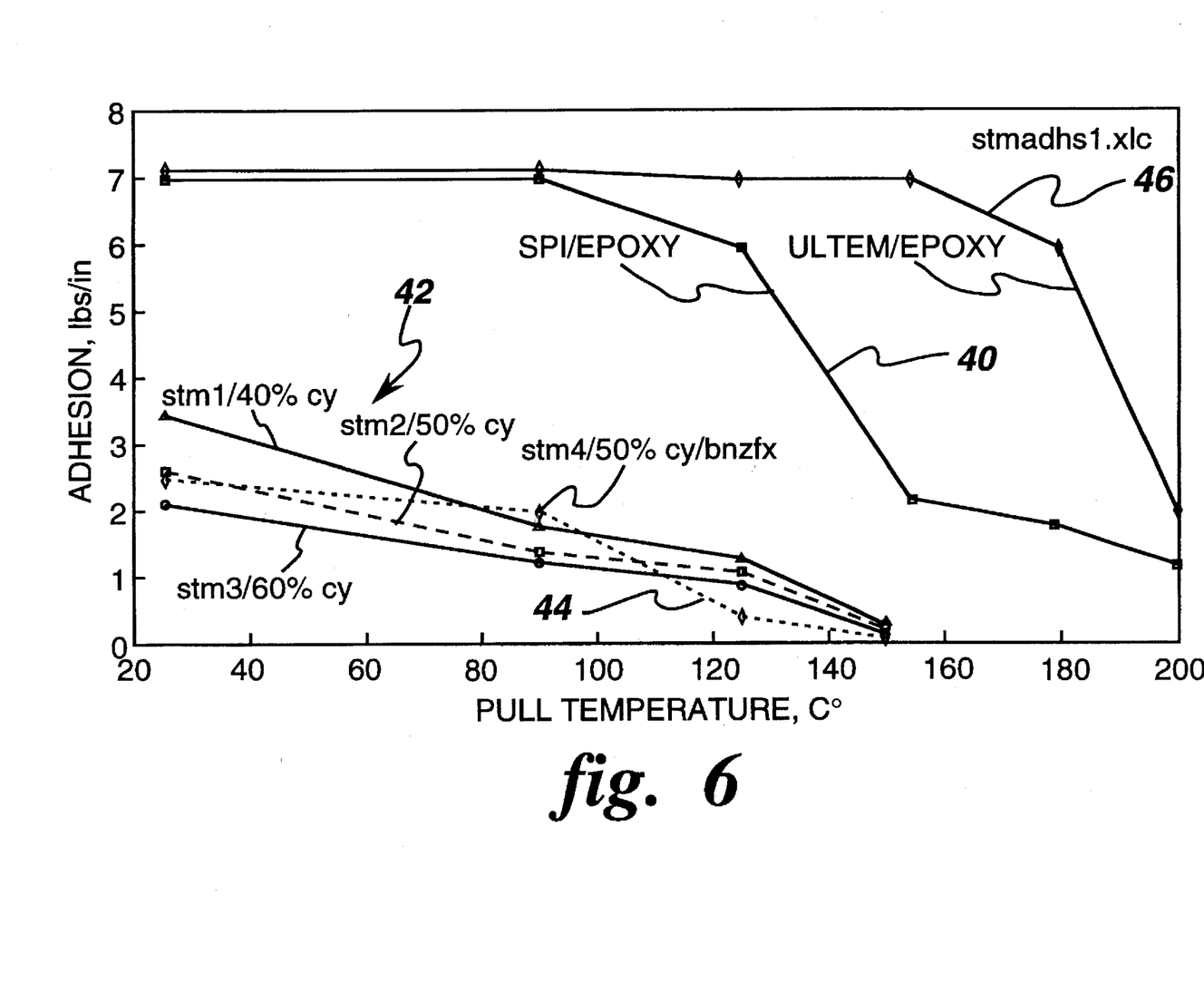
FIG. 6 is a graphical representation of the adhesion strength of various materials to Kapton polyimide as a function of temperature.

Adhesion strength of various materials to Kapton polyimide is shown as a function of temperature in FIG. 6. Line 40 shows the adhesion strength of SPI/epoxy, which has a glass transition temperature Tg of about 150° C. A group of lines 42 depict adhesion strengths of various Siltem/epoxy blends, which have glass transition temperatures Tg of approximately 90° C. to 100° C. Thus Siltem/epoxy blends have a much lower softening point compared to SPI/epoxy blends. From line 44, it will be seen that addition of Benzoflex S552 plasticizer, available from Velsicol Chemical Corp. (such as tetrabenzoyl pentaerythritol) further lowers the softening point of the adhesive. Further, Siltem polymer provides less adhesion to Kapton polyimide, and this is due to the higher siloxane content of Siltem compared to the SPI polymer, which has a siloxane content between 10% and 20% of the polymer composition by weight.

As noted hereinabove, these differences are employed to advantage in the present invention, where the Siltem/epoxy blend is employed for releasably retaining micromold layer 28, such that micromold layer 28 can be removed without damage to the rest of the structure which undergoes HDI fabrication techniques.

For reference purposes, line 46 in FIG. 6 indicates the adhesion strength of Ultem/epoxy blends with reference to temperature. Ultem/epoxy blends have an even higher glass transition temperature than SPI/epoxy blends.

Figure 7:
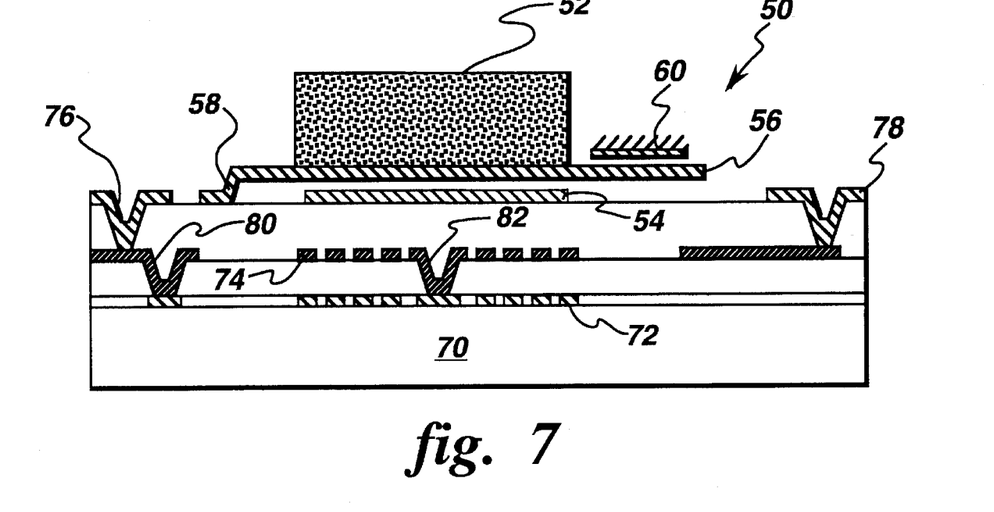
FIG. 7 is a cross-sectional representation of an electromagnetically-actuated micromechanical structure fabricated in accordance with the invention.

FIG. 7 represents a more specific example of an electromagnetically actuated electromechanical structure 50, including an attached permanent magnet 52 which may be fabricated in accordance with the invention. Structure 50 comprises an electromagnetically actuated switch, including a fixed electrode 54 and a movable electrode 56 comprising a simple cantilever beam, attached at 58, and restrained against excessive upward movement by a retainer 60.

For imparting movement to cantilevered switch contact 56, the "plastic" magnet 52 is attached, and comprises magnetic particles encased in an SPI/epoxy adhesive.

Below and providing support for fixed electrode 54 is a multi-layer ceramic structure 70 including embedded coils 72 and 74, appropriately electrically connected to contact pads through vias 76 and 78 employing embedded conductors, including vias 80 and 82. It will be appreciated that, depending upon the polarity applied to coils 72 and 74, a magnetic field is produced which either attracts or repels magnet 52 and, consequently, movable switch contact 56.

The micromechanical structure of FIG. 7 is merely one example of an electromagnetically actuated micromechanical structure which may be fabricated in accordance with the invention. For example, an alternative switch configuration is disclosed in the above-referenced application Ser. No. 08/000,172.

Figure 8:
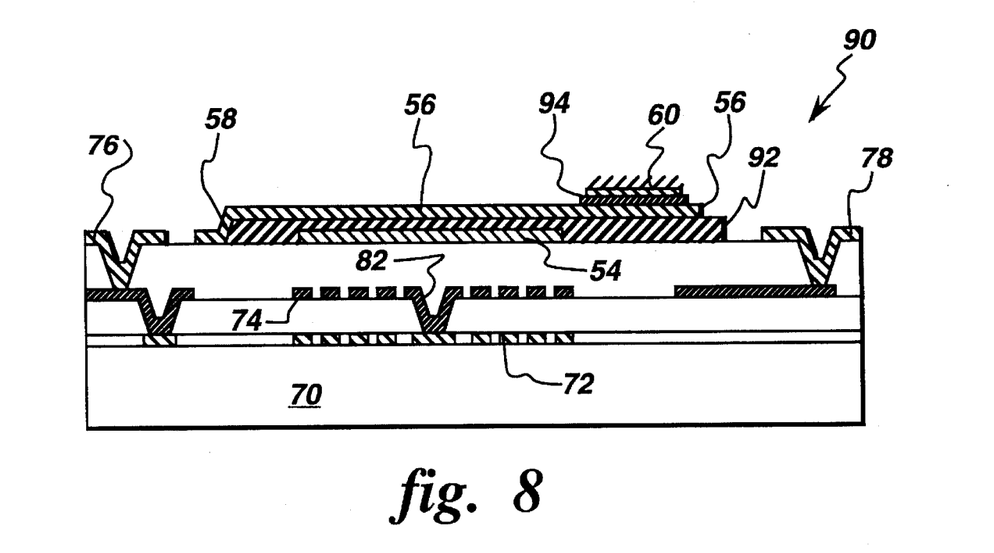
FIG. 8 depicts, in cross section, a precursor to the micromechanical structure of FIG. 7.

Fabrication of electromagnetically actuated switch 50 begins with the fabrication of a precursor structure 90, illustrated in FIG. 8. Precursor 90 includes a base comprising ceramic substrate 70 and fixed electrode 54, switch element 56 which is subsequently to become movable relative to base 70 and fixed electrode 54, and a sacrificial layer 92, of copper for example, separating ceramic substrate 70 and fixed electrode 54, on the one hand, from switch element 56, on the other hand. Another layer of sacrificial material 94, which likewise may be copper, separates retainer element 60 from switch element 56.

Precursor structure 90 is fabricated employing known semiconductor batch processing and HDI fabrication techniques, and may be a portion of a much larger structure, likewise fabricated employing HDI fabrication techniques. There may be a multiplicity of such precursors on a single substrate, for example, one thousand.

Figure 9:
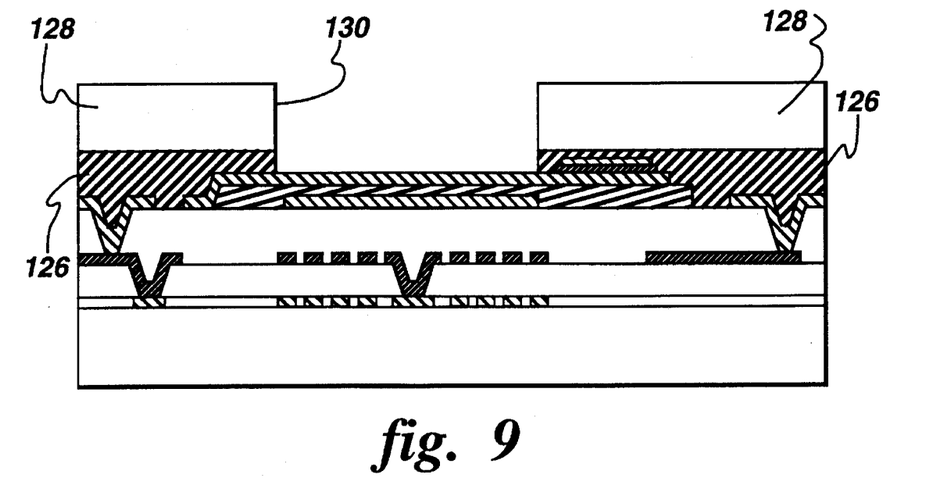
FIG. 9 represents, in cross section, an intermediate processing step, corresponding generally to that of FIG. 4.
Figure 10:
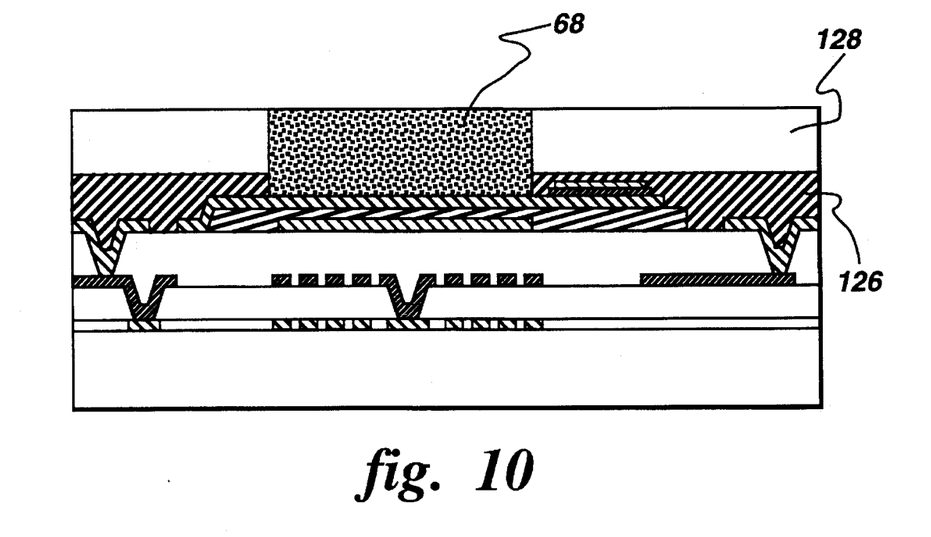
FIG. 10 depicts, in cross section, a processing step, corresponding generally to that of FIG. 5.

As shown in FIG. 9, which may be compared to FIG. 4, a first adhesive 126, preferably a Siltem/epoxy blend, is employed to releasably attach a mold layer 128 of Kapton polymer material, in the same manner as described hereinabove. A well-shaped cavity 130 is produced, likewise by laser ablation, and then filled as represented in FIG. 10 with a slurry of magnetic particles in a second adhesive, such as an HDI/epoxy blend. The slurry fill is cured to form a body of magnetic material 68, in the same manner as described above. Mold layer 128 of polymer material is then removed by heating to a temperature in the range of 100° C. to 120° C., which is insufficiently high to cause separation of body 68 from switch element 56, and by employing a suitable solvent (such as cyclopentanone, typically in a soak of less than 10 minutes) to remove residual quantities of the Siltem/epoxy first adhesive layer 126.

At a suitable point in the process, magnetic material 68 is magnetized in a magnetic field on the order of 20 kOe, using an electromagnet (not shown).

As a final step, sacrificial layers 92 and 94 of copper are removed by a selective etchant, such as $FeCl_3$ solution, resulting in the structure of FIG. 7. The $FeCl_3$ solution does not attack the NdFeB because the NdFeB is encased in SPI/epoxy plastic.

Due to the smaller magnet size achievable with the molded magnets of the invention, which weigh less than the purchased and cut magnets of the prior art approach, the switch of FIG. 7 operates at approximately half the input current needed to operate the purchased magnets separately attached by the pick-and-place prior art method described above.

The following four tables summarize the measured properties of microfabricated switch structures in accordance with the present invention (Structure Nos. 1 and 2), contrasted with microfabricated switches employing separately formed magnets attached employing pick-and-place techniques (Structure Nos. 3 and 4).

| Quanitiy | cgs Value | Measurement |
|---|---|---|
| Structure No. 1 NdFeB, 70% by wt in SPI/Epoxy (51% solids) (80 mils × 80 mils × 10 mils high), | | |
| Magnetic Induction | $B_{HC}$ | 1200 gauss |
| Coercive Force | $H_C$ | 9500 Oe |
| Magnetization | $M_R$ | 100 gauss |
| Intrinsic Flux Density | $4\pi M_R$ | 1261 gauss |
| Structure No. 2 NdFeB, 90% by wt in SPI/Epoxy (51% solids) (80 mils × 80 mils × 10 mils high), | | |
| Magnetic Induction | $B_{HC}$ | 1600 gauss |
| Coercive Force | $H_C$ | 9700 Oe |
| Magnetization | $M_R$ | 135 gauss |
| Intrinsic Flux Density | $4\pi M_R$ | 1699 gauss |
| Structure No. 3 (Prior Art approach) Solid NdFeB magnet purchased (80 mils × 80 mils × 40 mils high). | | |
| Magnetic Induction | $B_{HC}$ | 8700 gauss |
| Coercive Force | $H_C$ | 14050 Oe |
| Magnetization | $M_R$ | 881 gauss |
| Intrinsic Flux Density | $4\pi M_R$ | 11082 gauss |
| Structure No. 4 (Prior Art approach) Solid NdFeB magnet purchased (80 mils × 80 mils × 8.85 mils high, ground down), | | |
| Magnetic Induction | $B_{HC}$ | 5950 gauss |
| Coercive Force | $H_C$ | 12100 Oe |
| Magnetization | $M_R$ | 701 gauss |
| Intrinsic Flux Density | $4\pi M_R$ | 8815 gauss |

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A method for fabricating an electromagnetically actuated micromechanical structure, comprising the steps of:

fabricating a precursor to a micromechanical structure, the precursor including a base, an element subsequently to become moveable relative to the base, and a sacrificial layer separating the base and the element and supporting the base on the element;

employing a first adhesive to releasably attach a mold layer of polymer material to the element;

forming a well-shaped cavity extending through the mold layer of polymer material;

filling the well-shaped cavity with a slurry of magnetic particles in a second adhesive;

curing the second adhesive to form a body of magnetic material;

removing the mold layer of polymer material and the first adhesive while allowing the body to remain adhered to the element; and releasing the element for movement relative to the base by employing a selective etch to remove the sacrificial layer.

2. The method of claim 1, wherein the first adhesive has a lower adhesion strength than the second adhesive when heated, and wherein the step of removing the mold layer of polymer material comprises heating the precursor, mold layer and adhesives.

3. The method of claim 2, which further comprises the step of magnetizing the body.

4. The method of claim 1, wherein the step of fabricating a precursor to a micromechanical structure comprises fabricating a precursor which includes an electromagnet.

5. The method of claim 1, wherein the step of fabricating a precursor to a micromechanical structure comprises fabricating a precursor wherein the element is an electrical switch contact.

6. The method of claim 1, wherein the first adhesive comprises a blend of an epoxy resin and a siloxane polyimide polymer.

7. The method of claim 1, wherein the second adhesive comprises a blend of an epoxy resin and a siloxane polyimide polymer.

8. The method of claim 6, wherein the second adhesive comprises a blend of said epoxy resin and a second siloxane polyimide polymer.

9. The method of claim 1, wherein the step of forming a well-shaped cavity comprises laser-ablating a predetermined portion of said mold layer of polymer material.

10. The method of claim 9, wherein the step of forming a well-shaped cavity comprises:

providing a metal mask over the mold layer of polymer material, with an opening in the metal mask defining the cavity location; and ablating with a laser the polymer material where not masked.

* * * * *